(12) United States Patent
Dai et al.

(10) Patent No.: US 8,867,559 B2
(45) Date of Patent: Oct. 21, 2014

(54) MANAGING STARVATION AND CONGESTION IN A TWO-DIMENSIONAL NETWORK HAVING FLOW CONTROL

(71) Applicant: Intel Corporation, Santa Clara, CA (US)

(72) Inventors: Donglai Dai, Pleasanton, CA (US); Andres Mejia, Santa Clara, CA (US); Gaspar Mora Porta, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 13/629,351

(22) Filed: Sep. 27, 2012

(65) Prior Publication Data

US 2014/0086260 A1    Mar. 27, 2014

(51) Int. Cl.
    *H04L 12/28*    (2006.01)

(52) U.S. Cl.
    USPC ......................................................... 370/414

(58) Field of Classification Search
    None
    See application file for complete search history.

(56) References Cited

U.S. PATENT DOCUMENTS

| | | | |
|---|---|---|---|
| 6,018,765 A | 1/2000 | Durana et al. | |
| 6,751,698 B1 * | 6/2004 | Deneroff et al. | 710/317 |
| 6,961,781 B1 * | 11/2005 | Mukherjee et al. | 709/240 |
| 6,968,392 B1 | 11/2005 | Wilford et al. | |
| 6,975,638 B1 | 12/2005 | Chen et al. | |
| 8,081,646 B1 * | 12/2011 | Bishop et al. | 370/413 |
| 8,228,930 B1 * | 7/2012 | Kim et al. | 370/413 |
| 2003/0225737 A1 * | 12/2003 | Mathews | 707/1 |
| 2005/0053057 A1 * | 3/2005 | Deneroff et al. | 370/360 |
| 2007/0140240 A1 * | 6/2007 | Dally et al. | 370/389 |
| 2008/0091866 A1 * | 4/2008 | Cox et al. | 710/243 |
| 2008/0106951 A1 * | 5/2008 | Olesinski et al. | 365/189.05 |
| 2008/0114479 A1 * | 5/2008 | Wu et al. | 700/94 |
| 2008/0151894 A1 * | 6/2008 | Maiyuran et al. | 370/392 |
| 2009/0097495 A1 * | 4/2009 | Palacharla et al. | 370/413 |
| 2011/0072177 A1 * | 3/2011 | Glasco et al. | 710/244 |
| 2011/0161601 A1 * | 6/2011 | Vash et al. | 711/146 |
| 2011/0167191 A1 * | 7/2011 | Olesinski et al. | 710/316 |
| 2012/0042106 A1 * | 2/2012 | Futral et al. | 710/244 |
| 2012/0230342 A1 | 9/2012 | Iny et al. | |
| 2013/0097350 A1 * | 4/2013 | Ansari et al. | 710/244 |

FOREIGN PATENT DOCUMENTS

| | | |
|---|---|---|
| EP | 1564643 | 8/2005 |
| WO | WO 2014/051758 | 4/2014 |

OTHER PUBLICATIONS

PCT International Search Report and Written Opinion in PCT International Application Serial No. PCT/US2013/046397 mailed on Sep. 24, 2013.

* cited by examiner

*Primary Examiner* — Otis L Thompson, Jr.
(74) *Attorney, Agent, or Firm* — Patent Capital Group (57) ABSTRACT

An apparatus that includes input ports, input buffers coupled with respective input ports, output ports, and routing control circuitry coupled with the input ports, the input buffers and/or the output ports. The plurality of input buffers and the plurality of output ports, the routing control circuitry to maintain a two-tier priority scheme having at least two queues for prioritizing requests stored in the plurality of input buffers.

24 Claims, 4 Drawing Sheets

FIG. 4

MANAGING STARVATION AND CONGESTION IN A TWO-DIMENSIONAL NETWORK HAVING FLOW CONTROL

TECHNICAL FIELD

Embodiments of the invention relate to techniques for traffic management between connected nodes. More particularly, embodiments of the invention relate to a multi-tier arbitration scheme that may be used to traffic management between the connected nodes.

BACKGROUND

For traffic between connected devices, for example, nodes within a multi-node system or processing cores on a chip or processing cores and memory devices, routers are utilized to manage traffic. For example, routers with multiple virtual channels may use round robin priority arbitration schemes in both local arbitration (LA) and global arbitration (GA) stages.

However, the combination of independent round robin schemes may result in priority miss-alignments between the LA arbiter and the GA arbiter, which can increase the interconnect latency by orders of magnitude beyond average network latency. This potential raises concerns about arbitration fairness and delivery predictability for message traffic.

Worst case miss-alignments that may occur consist primarily of persistent loss of priority either at the LA arbiter or the GA arbiter and is a result of independent round robin policies used at each stage. For example, when a message is able to receive a highest priority at the LA arbiter, the GA arbiter may point to a different port when the message finally arrives and the LA arbiter may have already changed the highest priority to a different message that is not the oldest at the input port. This may happen multiple times for the same message, increasing the worst case latency, even up to starvation.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

In the following description, numerous specific details are set forth. However, embodiments of the invention may be practiced without these specific details. In other instances, well-known circuits, structures and techniques have not been shown in detail in order not to obscure the understanding of this description.

Based on current technology advancement trends, processor packages with tens to hundreds of processing cores and other functional blocks can be integrated on a single die and will be widely available for use in, for example, cloud computing environments. The arbitration scheme described herein may be utilized in any interconnection network between these processor cores and/or other functional blocks and may provide fairness and latency predictability for messages (packets) routed through the architecture. Interconnection schemes can include, for example, two-dimensional router-based mesh or torus interconnect with virtual channel support, which can be very scalable. The techniques described herein may be applied to interconnections between packages as well.

Figure 1:
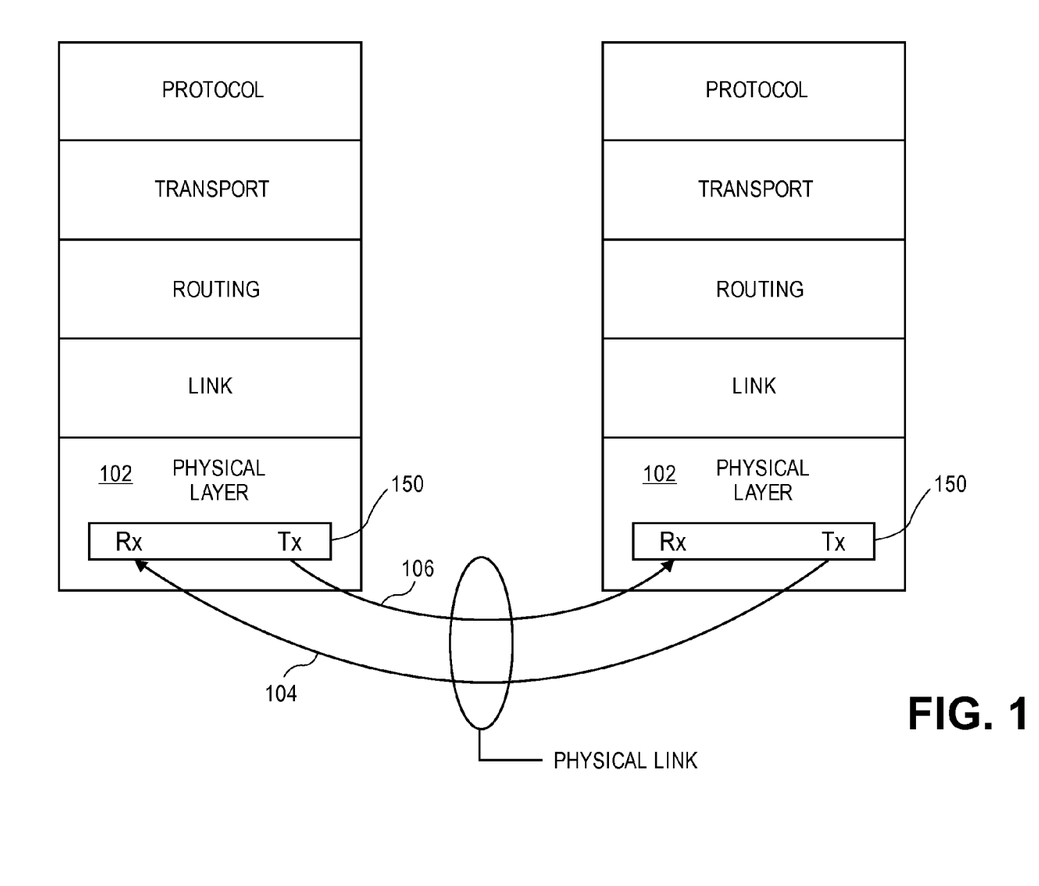
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer may provide communication between two ports over a physical interconnect comprising two uni-directional links. Specifically, one uni-directional link 104 from first transmit port 150 in physical layer 102 of a first integrated device to a first receiver port 150 of a second integrated device. Likewise, a second uni-directional link 106 from a first transmit port 160 in physical layer 112 of the second integrated device to a first receiver port 150 of the first integrated device. However, the claimed subject matter is not limited to two uni-directional links.

The links described with respect to FIG. 1 may be used, for example, as interconnections between an on-chip network. The on-chip network may include, for example, multiple processing cores, multiple caches, multiple memories, other components and/or any combination thereof. The techniques described herein may significantly reduce the worst case delay experienced by a packet (message) or eliminate starvation of a packet (message) in an on-chip network with multiple virtual channels. This may result in improved latency predictability, even under heavy congestion.

In an on-chip network, for example, several routers may be interconnected and utilized to provide the desired bandwidth. Routers may be designed with the availability to support multiple virtual channels to allow all message types to be mapped to the same physical network, thus providing optimal use of the available bandwidth for a given traffic mix at any time and at any point in the network. The router with virtual channels typically contains two different arbitration stages. The Local Arbiter (LA) that belongs to a particular input port, and, during a second stage, the Global Arbiter (GA) that selects a winner among all input ports that compete for a particular output port.

Figure 2:
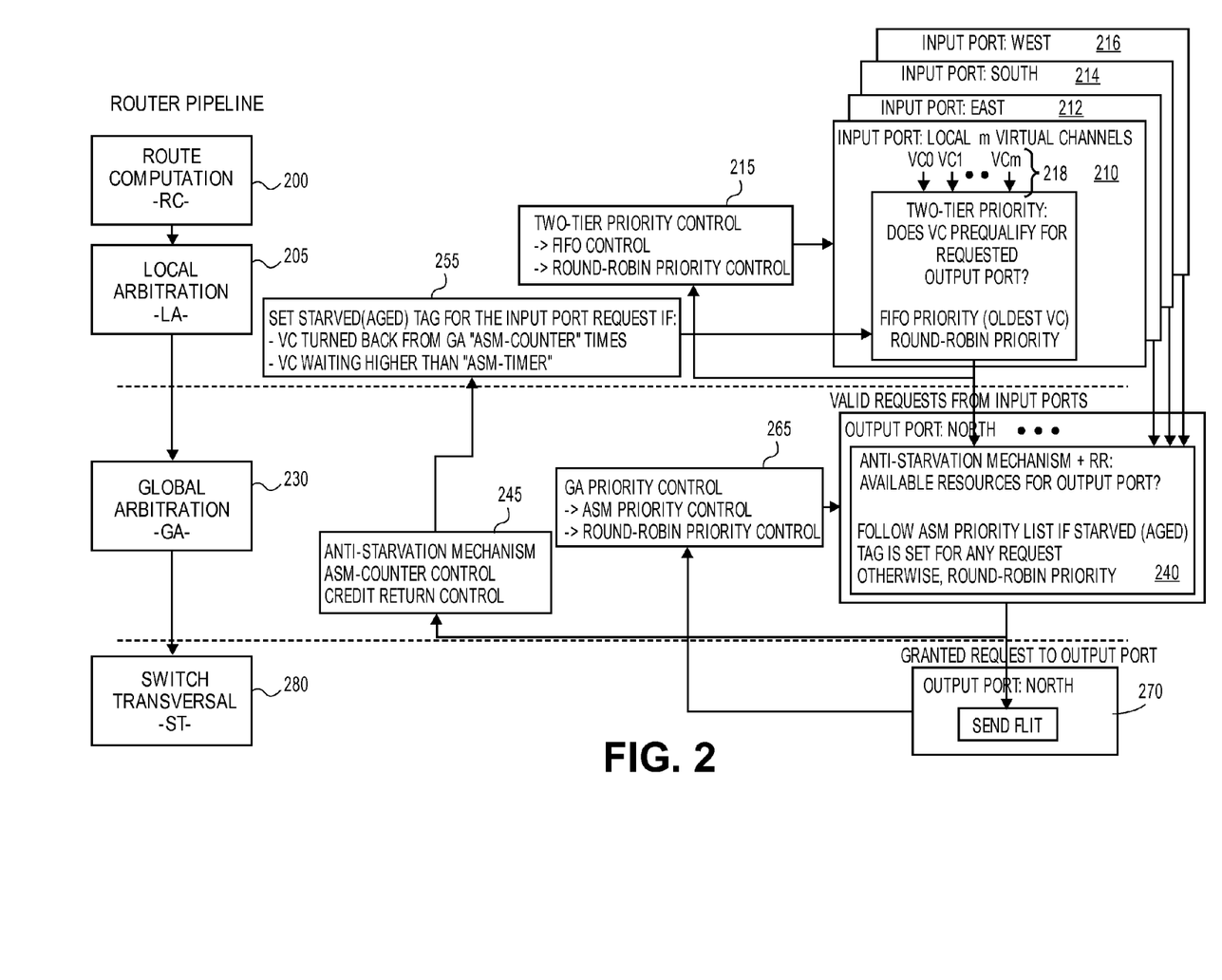
FIG. 2 is a conceptual diagram of a router pipeline and arbitration scheme as described herein.

FIG. 2 is a conceptual diagram of a router pipeline and arbitration scheme as described herein. The techniques described herein utilize multiple different arbitration schemes that maintain priority alignment between the LA and the GA. In one embodiment, a technique utilizing two-tier priority arbitration at the LA stage and an anti-starvation mechanism with round robin arbiter at the GA stage may be utilized.

A router may receive a packet (message) after route computation (RC), 200. Route computation may be accomplished according to any technique known in the art. Route computation results in a path for a packet to travel through the interconnected nodes in the network, which may include one or more routers.

In one embodiment, the LA 205 utilizes a two-tier priority arbitration scheme. Packets (messages) that are received (e.g., travel across one or more links of the on-chip network) may be divided into flits. The first flit of a packet is referred to as the head flit, the last flit is referred to as the tail flit and any intervening flits are referred to as body flits.

In one embodiment, for each input port in a router, the input buffer is shared by all virtual channels (VCs) providing input to the router port. The example of FIG. 2 provides four input ports (e.g., 210, 212, 214, 216); however, any number of input ports may be supported. Further, each input port may support any number of VCs (e.g., 218). In one embodiment, each VC maintains a separate linked list among the flits belonging to it. There may be multiple types of VCs, for example, routing VCs (RVCs) and performance VCs (PVCs).

In one embodiment, two priority queues are maintained among all VCs that may operate according to two strategies, 215. In alternate embodiments, more than two priority queues may be supported. In the example of FIG. 2, the first priority queue may operate in a First-In, First-Out (FIFO) order. The second priority queue may operate in a Round Robin (RR) manner. In one embodiment, the size of the RR queue equals the total number of VCs supported by a single physical port. The size of the FIFO queue also equals the total number of VCs supported by a single physical port.

In one embodiment, every VC has one slot in the RR priority queue at all times. In one embodiment, any VC with a flit waiting will have a slot in the FIFO queue only if the leading flit has waited long enough. Insertion of the VC into the FIFO queue occurs at the time of age threshold crossing. Deletion of the VC from the FIFO occurs upon successful crossbar arbitration and resource (i.e., VC and credit) availability. In one embodiment, the deletion occurs only if there is no other queued flit associated with that VC at that input port. The FIFO slots are considered a subset of RR slots.

In one embodiment, each input VC context has an associated timer that starts counting in response to the leading flit arriving and waits for grant. Once the timer expires after a configurable waiting time, the corresponding VC is entered into the FIFO queue and the timer is disabled unless the VC insertion into the FIFO queue is delayed. If multiple VC timers expire at the same time, the VCs may be entered into the FIFO in a selected order, for example, based on VC index. In one embodiment, the insertion is performed one entry per clock cycle, delaying other entries for subsequent clock cycles. These timers can be considered saturation timers.

In one embodiment, for each input port, arbitration is accomplished in the following manner. All active VC requests are filtered by pre-qualification based on the availability of their respective target port, VC and/or credit. Among the qualified requesting VCs, the one that is at the head of the FIFO queue is selected as the winner. If so, the VC is de-queued and the timer starts again if there are more flits waiting for that VC. If not the RR queue determines the winner.

A single candidate per input port is then passed to the second (GA) stage of arbitration 230. The GA selects the oldest candidate among all different input port candidates. In one embodiment, anti-starvation mechanism with round robin arbiter 240 utilized at GA stage 230 provides two functions. The first is to raise the GA stage "awareness" of the starved (aged) packets at the input port and the second is to give waiting body and tail flits higher priority in using available buffer credits. Various embodiments of the anti-starvation mechanism within the GA stage are described below.

In one embodiment, a separate priority class is provided for VCs that have starved (aged) at input ports and/or have been turned back from GA stage 230 a selected number of times (programmable) because of lack of buffer credit or VC resources downstream. In one embodiment, the input port tags headers for packets that have starved and when the packets are subsequently presented to GA stage 230, they carry the tag, which causes GA stage 230 to place the request in a higher priority arbitration class that can be separate from the main arbitration scheme.

The higher priority arbitration and the regular round robin arbitration scheme have mutually disjoint requests (i.e., no overlap amongst the requests in the two arbitration schemes). The requests in the higher priority arbitration scheme (after passing a resource check) will be chosen before the round robin requests. This is provided by GA priority control 265.

The second function mentioned above facilitates keeping flits of long packets together with their respective header flits. In order to accomplish this, the starvation flag at the output port and credit return mechanism 245 may be utilized. One embodiment of a technique for operation of anti-starvation mechanism credit return and anti-starvation counter control is described in greater detail with respect to FIG. 3.

When a request with a starved (aged) tag is sent from GA 230 to LA 205 for retry, 255, the flit is checked to see if it is a body flit or a tail flit. If so, the starvation flag is set at the target output VC. Otherwise, the starvation flag is set in the corresponding output routing VC context.

In one embodiment, when a downstream credit is returned to an output port, the starvation flag is checked at the output port according to the following strategy. If the starvation flag is not set on the credited VC, the existing crediting policy remains unchanged. That is, a credit is put into the shared credit pool unless the occupancy is set for an in-use VC or it is reserved for a soon-to-be free routing VC. If the starvation flag is set on the credited VC, the crediting policy is changed. In one embodiment, if the reserved credit of that VC is not set, that reserved credit is set regardless of occupancy of that VC and the starvation flag of the VC is cleared. If the reserved credit for that VC is set, the returned credit is put into the shared pool.

In summary, the technique described above relies on two different arbitration schemes that maintain priority alignment between the LA and the GA. The technique combines a two-tier priority arbitration at the LA stage and an anti-starvation mechanism (ASM) with round robin arbiter at the GA stage. The two-tier priority arbitration at the LA stage relies on a double priority scheme. The first priority queue works in a FIFO order and the second priority queue works in a round robin fashion. Priority is given to the VC that is first in the FIFO queue; if no VC is qualified, the round robin scheme determines the winner. The anti-starvation mechanism with round robin arbiter used at the GA stage provides the stages "awareness" of starved packets at the input port(s) and gives waiting body and tail flits higher priority in using available buffer credit. The selected flit is transmitted, 270, via an output port, which is part of the switch transversal, 280, portion of the router pipeline.

Figure 3:
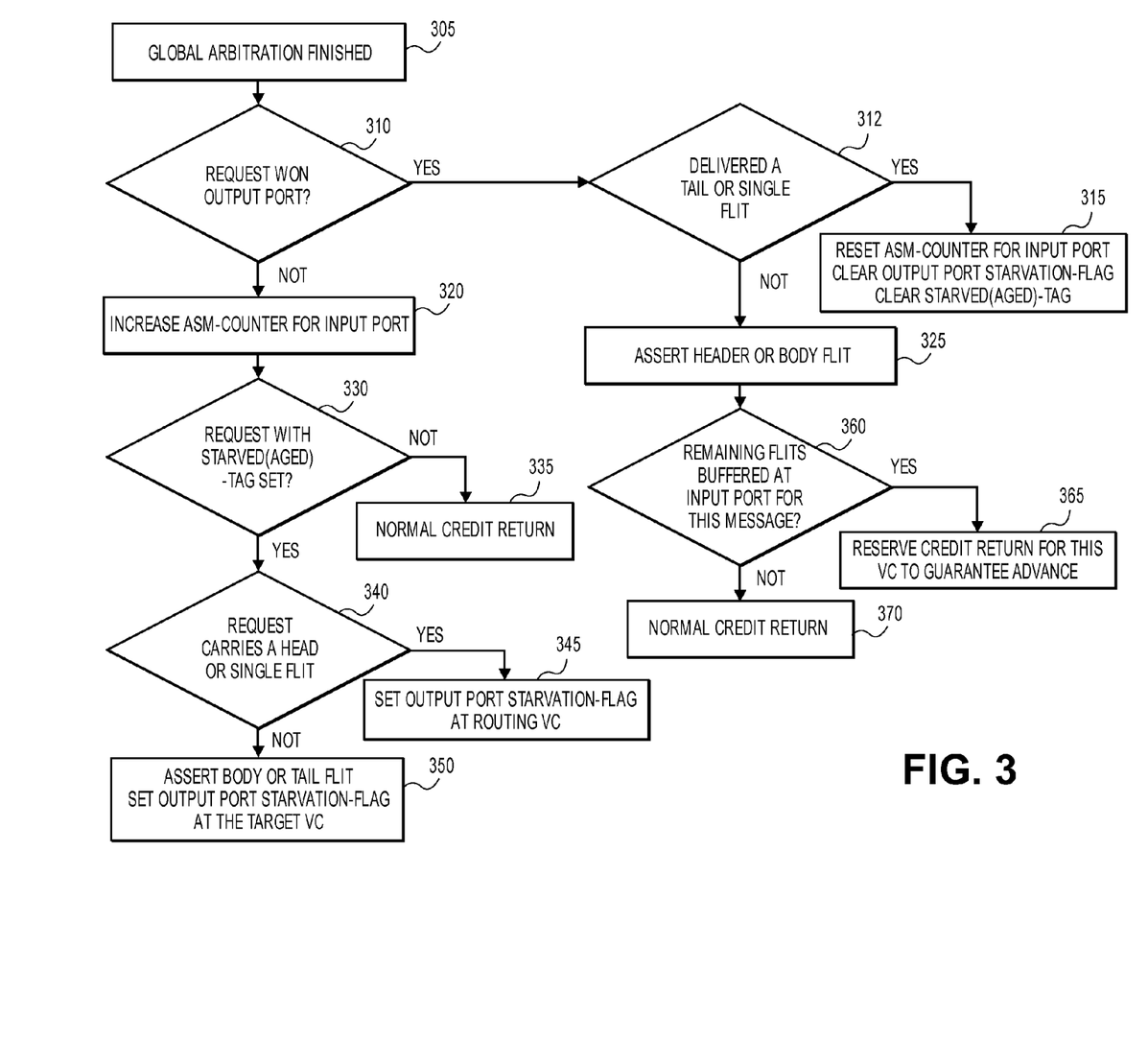
FIG. 3 is a flow diagram of one embodiment of a technique for operation of anti-starvation mechanism credit return and anti-starvation counter control.

FIG. 3 is a flow diagram of one embodiment of a technique for operation of anti-starvation mechanism credit return and anti-starvation counter control. The functionality described with respect to FIG. 3 may be provided in the GA stage to provide information to the LA stage to support the two different arbitration schemes that maintain priority alignment between the LA and the GA.

Global arbitration is performed, 305. The global arbitration is performed as described herein. The result of global arbitration is a determination of whether the request wins the output port. If the request does not win the output port, 310, the anti-starvation mechanism counter for the input port is increased, 320. If the request does not have its starved tag set, 330, then a normal credit return occurs, 335. If the request does have its starved tag set, 330, then the GA stage determines if the request carries a head flit or a single flit.

If the request carries a head flit or a single flit, 340, the output port starvation flag is set at the routing VC, 345. If the request does not carry a head flit or a single flit, 340, then the GA stage asserts body or tail flit and sets the output starvation flag at the target VC, 350.

Returning to the result of global arbitration, 305, if the request does win the output port, 310, the global arbitration stage determines whether a tail flit or a single flit has been delivered. If a tail flit or a single flit has been delivered, 310, the ASM counter for the input port is reset, the output port starvation flag is cleared and the starvation tag is cleared, 315. If a tail flit or a single flit has not been delivered, 310, the flit is either a header flit or a body flit, 325.

For a header flit or a body flit, 325, if the remaining flits buffered at the input port are for the same message, 360, then a credit return is reserved for the VC to guarantee an advance, 365. For a header flit or a body flit, 325, if the remaining flits buffered at the input port are not for the same message, 360, then a normal credit return occurs, 370.

Figure 4:
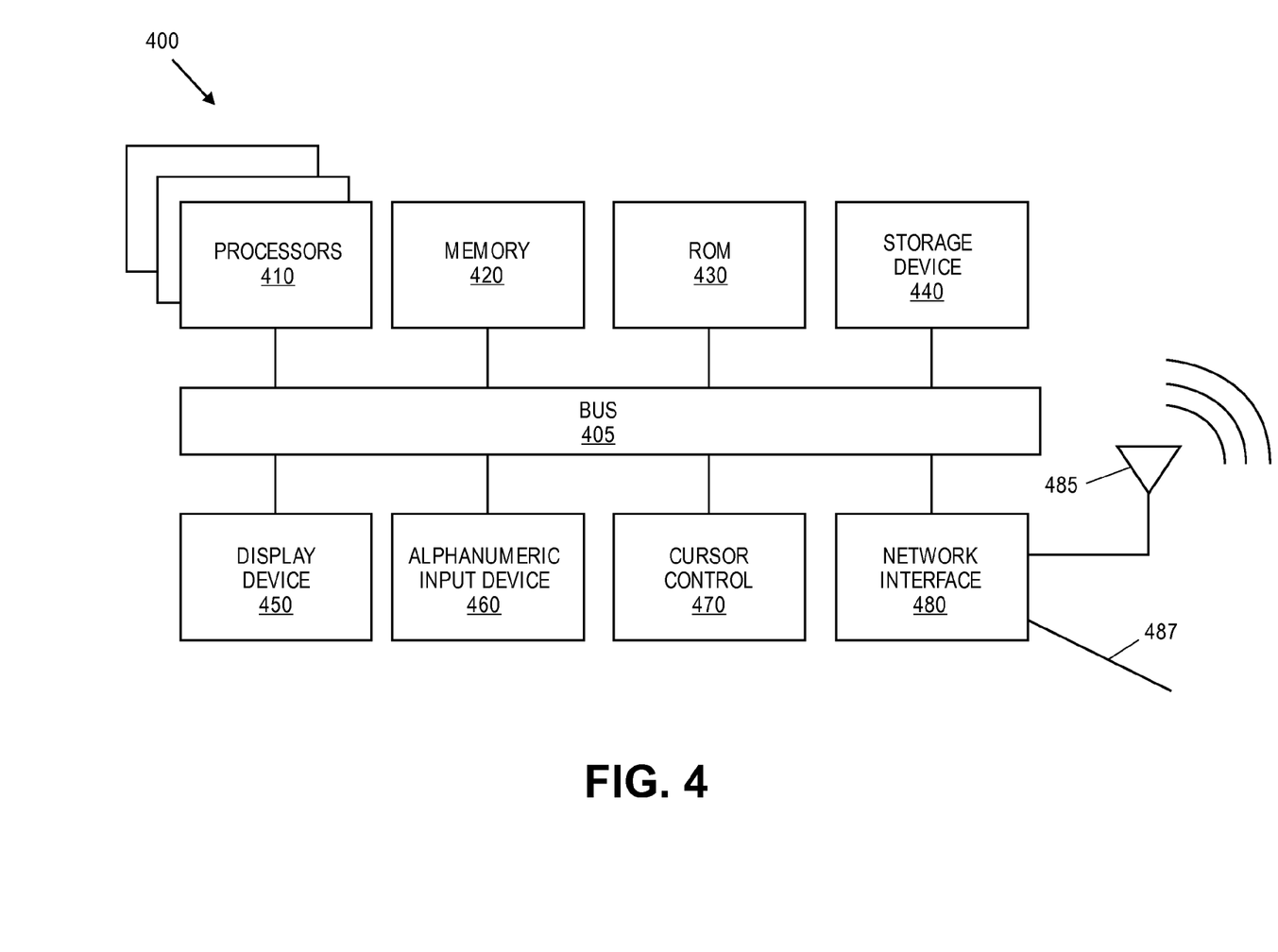
FIG. 4 is a block diagram of one embodiment of an electronic system.

FIG. 4 is a block diagram of one embodiment of an electronic system. The electronic system illustrated in FIG. 4 is intended to represent a range of electronic systems (either wired or wireless) including, for example, desktop computer systems, laptop computer systems, cellular telephones, set top boxes, smart phones, tablets, ultrabooks, netbooks. Alternative electronic systems may include more, fewer and/or different components.

Electronic system 400 includes interconnection network 405 or other communication device to communicate information, and processor 410 coupled to interconnection network 405 that may process information. While electronic system 400 is illustrated with a single processor, electronic system 400 may include multiple processors and/or co-processors. Electronic system 400 further may include random access memory (RAM) or other dynamic storage device 420 (referred to as main memory), coupled to interconnection network 405 and may store information and instructions that may be executed by processor 410. Main memory 420 may also be used to store temporary variables or other intermediate information during execution of instructions by processor 410.

Electronic system 400 may also include read only memory (ROM) and/or other static storage device 430 coupled to interconnection network 405 that may store static information and instructions for processor 410. Data storage device 440 may be coupled to interconnection network 405 to store information and instructions. Data storage device 440 such as a magnetic disk or optical disc and corresponding drive may be coupled to electronic system 400.

Electronic system 400 may also be coupled via interconnection network 405 to display device 450, such as a cathode ray tube (CRT) or liquid crystal display (LCD), to display information to a user. Alphanumeric input device 460, including alphanumeric and other keys, may be coupled to interconnection network 405 to communicate information and command selections to processor 410. Another type of user input device is cursor control 470, such as a mouse, a trackball, or cursor direction keys to communicate direction information and command selections to processor 410 and to control cursor movement on display 450.

Electronic system 400 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface(s) 480 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols, for example, IEEE 802.11n and Thunderbolt can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In one embodiment, an apparatus includes input ports, input buffers coupled with respective input ports, output ports, and routing control circuitry coupled with the input ports, the input buffers and/or the output ports. The plurality of input buffers and the plurality of output ports, the routing control circuitry to maintain a two-tier priority scheme having at least two queues for prioritizing requests stored in the plurality of input buffers. In one embodiment, each input buffer is shared by all virtual channels supported by the plurality of input ports.

In one embodiment, each virtual channel has a corresponding linked list of flits belonging to the virtual channel. In one embodiment, the two priority queues are a first queue maintained according to a first-in/first-out (FIFO) ordering and a second queue maintained according to a round robin ordering. In one embodiment, the two-tier priority scheme is maintained by a local arbitration stage with anti-starvation information provided by a global arbitration stage.

In one embodiment, the router control circuitry includes at least a local arbiter and a global arbiter. The local arbiter maintains a round robin queue to provide access for messages stored in input buffers to the output ports. The local arbiter also maintains a first-in/first-out (FIFO) queue for messages that have been in the round robin queue for greater than a selected threshold length of time. The messages in the FIFO queue are given a higher priority than messages in the round robin queue.

In one embodiment, the local arbiter passes to the global arbiter an oldest candidate message from all input buffer messages. The global arbiter operates as an anti-starvation mechanism with round robin queue arbiter to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

In one embodiment, the virtual channel crediting polices are determined based on whether the starvation flag is set for a corresponding message request. In one embodiment, at least one input port is coupled with a first processing core and at least one output port is coupled with a second processing core. The first processing core and the second processing core are within a single integrated circuit package.

In one embodiment, a method for managing traffic with a routing device having input ports and output ports included the following. A local arbiter maintains a round robin queue to provide access for messages stored in the input buffers to the output ports. The local arbiter also maintains a first-in/first-out (FIFO) queue for messages that have been in the round robin queue for greater than a selected threshold length of time. The messages in the FIFO queue are given a higher priority than messages in the round robin queue.

A global arbiter operates as an anti-starvation mechanism with round robin queue to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

In one embodiment virtual channel crediting polices are determined based on whether the starvation flag is set for a corresponding message request. In one embodiment, at least one of the input ports is coupled with a first processing core and at least one of the output ports is coupled with a second processing core, wherein the first processing core and the second processing core are within a single integrated circuit package.

In one embodiment, each input buffer is shared by all virtual channels supported by the input ports. In one embodiment, each virtual channel has a corresponding linked list of flits belonging to the virtual channel. In one embodiment, the two priority queues include a first queue maintained according to a first-in/first-out (FIFO) ordering and a second queue maintained according to a round robin ordering. In one embodiment, the two-tier priority scheme is maintained by a local arbitration stage with anti-starvation information provided by a global arbitration stage.

In one embodiment, an apparatus for managing traffic with a routing device having input ports and output ports includes the following. Means for maintaining, within a local arbiter, a round robin queue to provide access for messages stored in the input buffers to the output ports. The local arbiter further maintains a first-in/first-out (FIFO) queue for messages that have been in the round robin queue for greater than a selected threshold length of time. The messages in the FIFO queue are given a higher priority than messages in the round robin queue. The apparatus further includes means for operating, within a global arbiter, an anti-starvation mechanism with round robin queue to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

In one embodiment, virtual channel crediting polices are determined based on whether the starvation flag is set for a corresponding message request. In one embodiment, at least one of the input ports is coupled with a first processing core and at least one of the output ports is coupled with a second processing core. The first processing core and the second processing core are within a single integrated circuit package.

In one embodiment, each input buffer is shared by all virtual channels supported by the plurality of input ports. In one embodiment, each virtual channel has a corresponding linked list of flits belonging to the virtual channel. In one embodiment, the two priority queues comprise a first queue maintained according to a first-in/first-out (FIFO) ordering and a second queue maintained according to a round robin ordering. In one embodiment, the two-tier priority scheme is maintained by a local arbitration stage with anti-starvation information provided by a global arbitration stage.

In one embodiment, a communications device arranged to operate as described above. In one embodiment, a tablet computing device is arranged to operate as described above. In one embodiment, a smartphone device is arranged to operate as described above. In one embodiment, a laptop computing device is arranged to operate as described above. In one embodiment, a desktop computing device is arranged to operate as described above. In one embodiment, an ultrabook computing device is arranged to operate as described above.

In one embodiment, one or more integrated circuit packages contain one or more dies configured for managing traffic with a routing device having a plurality of input ports and a plurality of output ports configured to operate as described above. In one embodiment, a computing device includes an interconnection of functional components within a single integrated circuit package that operate as described above and a memory coupled to store data carried in one or more messages transmitted via at least one output buffer.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

The invention claimed is:
1. An apparatus comprising:
a plurality of input ports;
a plurality of input buffers coupled with respective input ports;
a plurality of output ports;
routing control circuitry coupled with the plurality of input ports, the plurality of input buffers and the plurality of output ports, wherein the router control circuitry comprises at least a local arbiter and a global arbiter, the local arbiter to maintain a round robin queue to provide access for messages stored in the plurality of input buffers to the plurality of output ports, the local arbiter further to maintain a first-in/first-out (FIFO) queue for messages that have been in the round robin queue for greater than a selected threshold length of time, wherein the messages in the FIFO queue are given a higher priority than messages in the round robin queue.

2. The apparatus of claim 1 wherein each input buffer is shared by all virtual channels supported by the plurality of input ports.

3. The apparatus of claim 1, wherein each virtual channel has a corresponding linked list of flits belonging to the virtual channel.

4. The apparatus of claim 1 wherein the two priority queues comprise a first queue maintained according to a first-in/first-out (FIFO) ordering and a second queue maintained according to a round robin ordering.

5. The apparatus of claim 1 wherein the two-tier priority scheme is maintained by a local arbitration stage with anti-starvation information provided by a global arbitration stage.

6. The apparatus of claim 1 wherein the local arbiter passes to the global arbiter an oldest candidate message from all input buffer messages and the global arbiter operates as an anti-starvation mechanism with round robin queue arbiter to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

7. The apparatus of claim 6 wherein virtual channel crediting polices are determined based on whether the starvation flag is set for a corresponding message request.

8. A method for managing traffic with a routing device having a plurality of input ports and a plurality of output ports, the method comprising:
maintaining, with a local arbiter, a round robin queue to provide access for messages stored in the plurality of input buffers to the plurality of output ports, the local arbiter further to maintain a first-in/first-out (FIFO) queue for messages that have been in the round robin queue for greater than a selected threshold length of time, wherein the messages in the FIFO queue are given a higher priority than messages in the round robin queue; and
operating, with a global arbiter, an anti-starvation mechanism with round robin queue to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

9. The method of claim 8 wherein virtual channel crediting polices are determined based on whether the starvation flag is set for a corresponding message request.

10. The method of claim 9 wherein each input buffer is shared by all virtual channels supported by the plurality of input ports.

11. The method of claim 9, wherein each virtual channel has a corresponding linked list of flits belonging to the virtual channel.

12. The method of claim 9 wherein the two priority queues comprise a first queue maintained according to a first-in/first-out (FIFO) ordering and a second queue maintained according to a round robin ordering.

13. The method of claim 9 wherein the two-tier priority scheme is maintained by a local arbitration stage with anti-starvation information provided by a global arbitration stage.

14. An apparatus for managing traffic with a routing device having a plurality of input ports and a plurality of output ports, the apparatus comprising:
means for maintaining, within a local arbiter, a round robin queue to provide access for messages stored in the plurality of input buffers to the plurality of output ports, the local arbiter further to maintain a first-in/first-out (FIFO) queue for messages that have been in the round robin queue for greater than a selected threshold length of time, wherein the messages in the FIFO queue are given a higher priority than messages in the round robin queue; and
means for operating, within a global arbiter, an anti-starvation mechanism with round robin queue to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

15. The apparatus of claim 14 wherein virtual channel crediting polices are determined based on whether the starvation flag is set for a corresponding message request.

16. The apparatus of claim 14 wherein each input buffer is shared by all virtual channels supported by the plurality of input ports.

17. The apparatus of claim 14, wherein each virtual channel has a corresponding linked list of flits belonging to the virtual channel.

18. The apparatus of claim 14 wherein the two priority queues comprise a first queue maintained according to a first-in/first-out (FIFO) ordering and a second queue maintained according to a round robin ordering.

19. The apparatus of claim 14 wherein the two-tier priority scheme is maintained by a local arbitration stage with anti-starvation information provided by a global arbitration stage.

20. A computing system comprising:
a first integrated circuit package having within it a plurality of input ports, a plurality of input buffers coupled with respective input ports, a plurality of output ports, and routing control circuitry coupled with the plurality of input ports, the plurality of input buffers and the plurality of output ports, the routing control circuitry comprising at least a local arbiter and a global arbiter, the local arbiter to maintain a round robin queue to provide access for messages stored in the plurality of input buffers to the plurality of output ports, the local arbiter further to maintain a first-in/first-out (FIFO) queue for messages that have been in the round robin queue for greater than a selected threshold length of time, wherein the messages in the FIFO queue are given a higher priority than messages in the round robin queue; and
a system on chip (SoC) coupled with the first integrated circuit package, the SoC having a plurality of functional circuits coupled to communicate with the first integrated package.

21. The system of claim 20 wherein the two priority queues comprise a first queue maintained according to a first-in/first-out (FIFO) ordering and a second queue maintained according to a round robin ordering.

22. The system of claim 20 wherein the two-tier priority scheme is maintained by a local arbitration stage with anti-starvation information provided by a global arbitration stage.

23. The system of claim 20 wherein the local arbiter passes to the global arbiter an oldest candidate message from all input buffer messages and the global arbiter operates as an anti-starvation mechanism with round robin queue arbiter to place messages tagged having a starvation flag set to a higher priority arbitration class that is separate from one or more main arbitration classes such that the higher priority class and the main classes have mutually disjoint sets of message requests and message requests in the higher priority class are chosen ahead of the main arbitration classes.

24. The system of claim 23 wherein virtual channel crediting polices are determined based on whether the starvation flag is set for a corresponding message request.

\* \* \* \* \*